United States Patent
Schwarzbach

(10) Patent No.: US 12,344,397 B2
(45) Date of Patent: Jul. 1, 2025

(54) AUTOMATIC DRONE POSITIONING SYSTEM

(71) Applicant: Marc Schwarzbach, Ottmarsheim (DE)

(72) Inventor: Marc Schwarzbach, Ottmarsheim (DE)

(73) Assignee: Guideline Robotics GmbH, Besigheim (DE)

( * ) Notice: Subject to any disclaimer, the term of this patent is extended or adjusted under 35 U.S.C. 154(b) by 26 days.

(21) Appl. No.: 18/249,132

(22) PCT Filed: Oct. 15, 2021

(86) PCT No.: PCT/EP2021/078634
§ 371 (c)(1),
(2) Date: Apr. 14, 2023

(87) PCT Pub. No.: WO2022/079254
PCT Pub. Date: Apr. 21, 2022

(65) Prior Publication Data
US 2024/0017858 A1    Jan. 18, 2024

(30) Foreign Application Priority Data

Oct. 16, 2020  (DE) .......................... 102020006385.3
Apr. 9, 2021   (DE) .......................... 102021001842.7

(51) Int. Cl.
*B64F 1/00*      (2024.01)
*B64U 80/10*     (2023.01)
(Continued)

(52) U.S. Cl.
CPC .............. *B64F 1/002* (2013.01); *B64U 80/10* (2023.01); *B64U 2101/64* (2023.01); *B64U 2101/66* (2023.01)

(58) Field of Classification Search
CPC .......... B64U 80/10; B64F 1/002; B64F 1/029; B64F 1/02
See application file for complete search history.

(56) References Cited

U.S. PATENT DOCUMENTS

| | | | |
|---|---|---|---|
| 3,139,249 | A | 6/1964 | Trifillis |
| 3,392,940 | A | 7/1968 | Valkenburg |

(Continued)

FOREIGN PATENT DOCUMENTS

| | | |
|---|---|---|
| EP | 3680181 | 7/2020 |
| WO | 2015195175 | 12/2015 |
| WO | 2019232753 | 12/2019 |

OTHER PUBLICATIONS

International Search Report for PCT Application No. PCT/EP2021/078634 (Dated Jan. 14, 2022).

(Continued)

*Primary Examiner* — Brady W Frazier
*Assistant Examiner* — Peter A Taraschi
(74) *Attorney, Agent, or Firm* — Hovey Williams LLP

(57) ABSTRACT

A system automatically positions a drone (1) on a landing/take-off site (2) including a landing area defined by an outer boundary. The system positions and aligns the drone (1), landed at any location on the landing area, at a predetermined position on the landing area. The system includes a rope sling (5) which, in its initial position, extends substantially along the outer boundary of the landing area, and the ends of which are connected to a rope winch (6) located near or at the predetermined position, so that the rope sling can be retracted when the rope winch is actuated. The drone is provided with engagement means (3, 4) engageable with the rope sling (5) when the rope sling (5) is retracted, so that the drone (1) is pulled to the predetermined position and is correctly aligned at the predetermined position upon further retraction of the rope sling (5).

20 Claims, 12 Drawing Sheets

(51) Int. Cl.
   *B64U 101/64*       (2023.01)
   *B64U 101/66*       (2023.01)

(56)          References Cited

U.S. PATENT DOCUMENTS 3,801,050  A  *   4/1974   Stone .................. B64F 1/125
                                                    114/261
   3,923,274  A  *  12/1975   Stocklin ................ B64F 1/12
                                                    244/17.17
  10,336,202  B2 *   7/2019   Panopoulos ......... H05B 47/175
  2014/0291442 A1   10/2014   Låks et al.
  2020/0062421 A1    2/2020   Paz Duart

OTHER PUBLICATIONS

Koji A O Suzuki et al. "Automatic Battery Replacement System for UAVs: Analysis and Design" Journal of Intelligent and Robotic Systems: Theory and Applications—(Incorporating Mechatronic Systems Engineering), Kluwer Academic Publishers, DO (vol. 65, No. 1-4) (Sep. 9, 2011) (pp. 563-586).
International Preliminary Report on Patentability for PCT Application No. PCT/EP2021/078634 (Dated Apr. 27, 2023).

\* cited by examiner

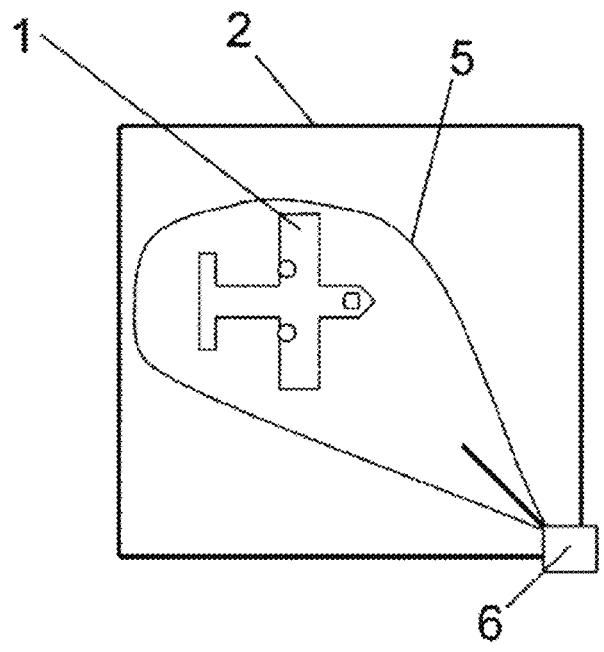
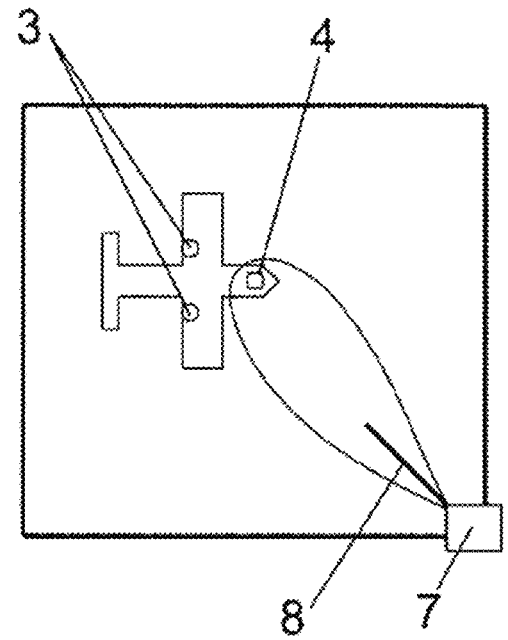
Fig. 1a    Fig. 1b
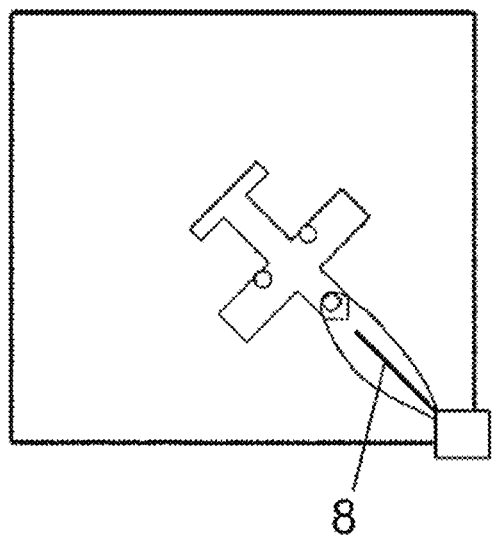
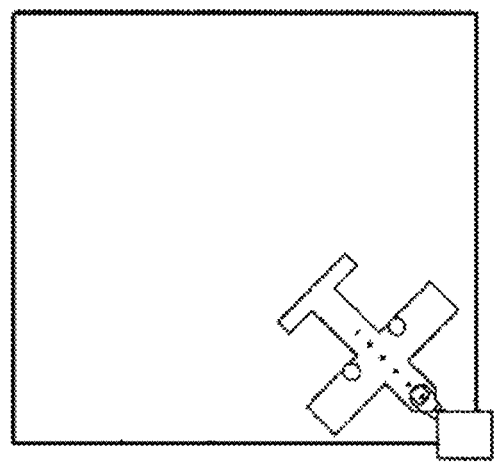
Fig. 1c    Fig. 1d

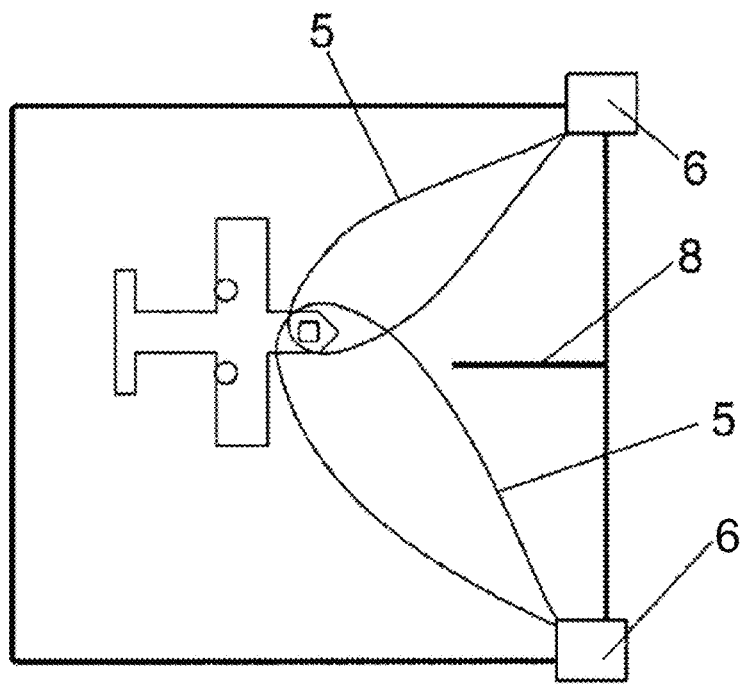
Fig. 6a
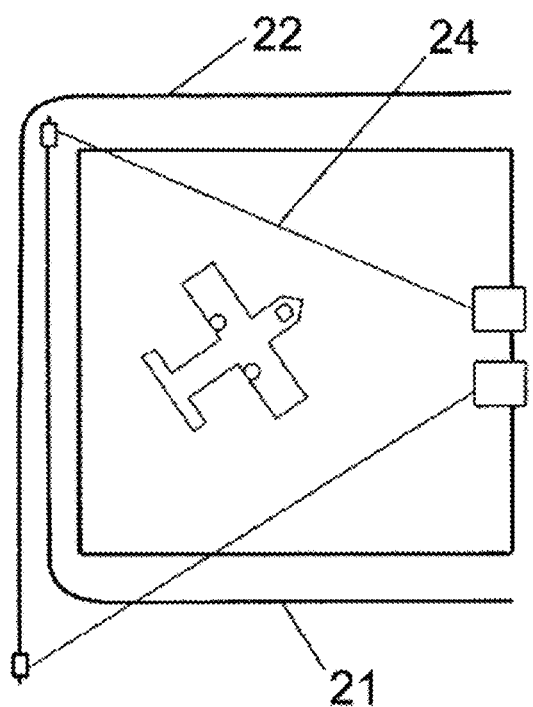 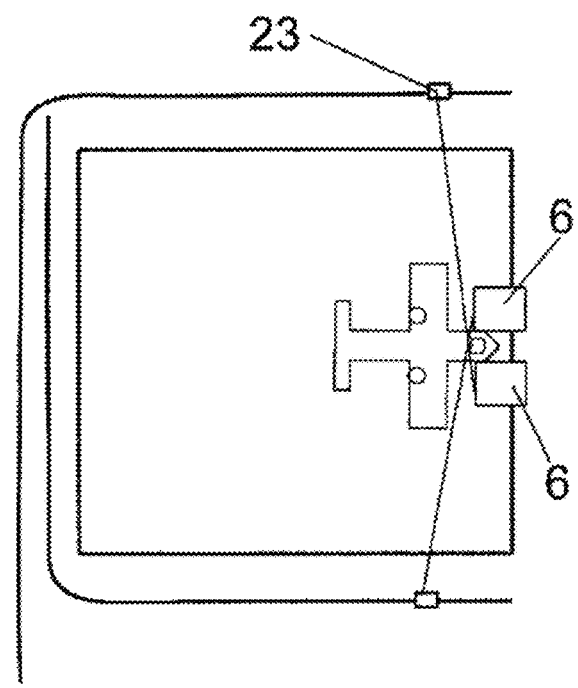
Fig. 6b          Fig. 6c

AUTOMATIC DRONE POSITIONING SYSTEM

CROSS REFERENCE TO RELATED APPLICATIONS

This is a National Phase Application pursuant to 35 U.S.C. § 371 of International Application No. PCT/EP2021/078634 filed Oct. 15, 2021, which claims the priority of German Application No. DE 10 2020 006 385.3 filed Oct. 16, 2020, and German Application No. DE 10 2021 001 842.7 filed Apr. 9, 2021, all three of which are hereby incorporated in their entireties by reference herein.

BACKGROUND OF INVENTION

1. Field of Invention

The present invention relates in general to a system for automatically positioning a drone on a landing/take-off site for the purpose of loading and unloading a drone, refueling a drone, charging a drone's battery, cargo exchange, payload exchange, etc.

Further, the present invention relates to a system for transporting various goods from a point of origin (consignor) to a remote destination (consignee) using a drone in combination with at least one stationary transport system and at least one system for automatically positioning a drone on a landing/take-off site.

2. Discussion of Prior Art

The term "goods" is understood to mean parcels, packages, containers, shipments, laboratory samples, blood reserves, medicine packages, pneumatic tube capsules, accumulators, functional payloads, etc., which are suitable in terms of shape and weight to be transported by a drone. For simplicity, the term "shipment" will be used hereinafter.

The present invention is preferably implemented using unmanned aerial vehicles. An unmanned aerial vehicle (UAV) is understood to be an aircraft that can be operated and navigated autonomously by a computer or from the ground by means of a remote control without a crew on board, whereby the rough determination of the position of the UAV can be carried out with the aid of the Global Positioning System (GPS), a Global Navigation Satellite System (GNSS), Galileo, etc. Additionally or alternatively, control or position determination is also possible with the aid of one or more cameras provided at the UAV, or also with other on-board and/or ground-based sensor means, such as vision, radar, radio beacons, lights, etc., all of which, however, only enable a rather imprecise position determination and thus only a rather imprecise landing of a UAV on a landing/take-off site. Smaller UAVs are usually powered by battery-operated electric motors, whereas larger UAVs can also be powered by an internal combustion engine. The payload of smaller UAVs is in the range of up to about 10 kg. Larger UAVs are capable of transporting shipments with a greater weight. In the German language, unmanned aerial vehicles are also referred to as drones, which is why the term "drone" is used below to refer to unmanned aerial vehicles of any type (in particular vertical take-off and landing aircrafts, helicopters, VTOLs, etc.).

The use of drones for various tasks has been steadily increasing for years. The fact that the costs of operating drones are significantly lower than those of manned aircraft or helicopters plays a major role in this. Due to increasing automation of drone systems, their use is also possible by less qualified people, which saves further costs.

In most cases, however, the use of drones still follows the principle of "one aircraft-one operator". This is also due to the fact that especially the operation of drones on the ground, e.g., changing or charging the batteries, refueling, unloading or loading the drone with a shipment (cargo), as well as securing the drone after the end of the mission, is currently done by labor-intensive manual work.

However, this limits the use of drones, especially in remote locations where no person can perform this work. Likewise, the need for additional personnel to perform these handling tasks leads to increased costs per flight, making the use of drones uneconomical in certain areas.

The take-off of a drone generally does not pose any special technical requirements, as the drone can simply take off from its current position from the landing/take-off site. During landing, however, the problem arises that the combination of inaccurate detection of a drone's position and limitations on the precise controllability of a drone often leads to serious positional errors at a drone's landing/take-off site. In other words: a "pinpoint" landing of the drone on the landing/take-off site is ultimately not possible. To solve this problem, various passive systems have already been proposed, for example, using some kind of funnel to physically guide and thus position a drone during the final phase of its landing on a landing/take-off site; however, such systems are limited in terms of their maximum size (i.e., they are more suitable for small drones) and further require a high basic accuracy when landing the drone. Active systems are also possible, where, for example, linear actuators can be used to "push" the drone to the desired position after landing by using multiple movable axes. But even here, problems arise with regard to the exact orientation of the drone, which can lead to the drone having an incorrect orientation after landing, for example relative to a power charging connector or a loading/unloading station, and then having to be manually realigned. The area or size required for the above systems is a result of the possible local precision of the landing, which may also depend on the weather, especially the wind. It is obvious that the costs increase disproportionately to the size of the positioning system, making the known systems uneconomical at some point.

Known positioning systems usually require extensive mechanical installations, motors and associated controls that are relatively prone to failure. Another disadvantage of known solutions is that they require high precision during landing in order to minimize the required area of the mechanical positioning systems. Methods for precise positioning (e.g. RTK, GPS, radio positioning (deck finder), image processing methods) are also expensive and sometimes quite unreliable.

Furthermore, systems using mobile platforms (e.g., on the roof of a car) or robotic systems to land (capture) drones are known, especially from the field of research. However, these systems require very complex control/regulation and are not considered sufficiently robust for widespread use.

SUMMARY

It is therefore an object of the present invention to further improve the solutions known from the prior art for positioning drones on a landing/take-off site in such a way that the disadvantages of the prior art are overcome. In particular, it is an object of the present invention to provide solutions that aim to automate the landing of drones on a landing/take-off site as well as the precise positioning and alignment of drones on the landing/take-off site. Another object of the present invention is to provide a system for automatically positioning and aligning a drone on a landing/take-off site, leading to the loading/unloading of a drone, the refueling of a drone, or the charging of a drone's battery being substantially shortened, which is structurally simple, can be implemented inexpensively, and is insensitive to interferences.

The above objects are solved by a system for automatically positioning a drone on a landing/take-off site comprising the features of claim 1. In additional independent and dependent claims, advantageous and preferred alternatives and further embodiments are defined.

According to the invention, a system for automatically positioning a drone is provided, by means of which the drone, after it has landed anywhere within a certain landing area on a landing/take-off site, is automatically and precisely transferred to a predetermined position and is also automatically correctly aligned. Preferably, after landing on the landing area of the landing/take-off site, the drone is automatically and precisely positioned as well as precisely aligned by the positioning system according to the invention relative to, for example, the loading/unloading station of a transport system or a device for refueling the drone or for charging or replacing the batteries of the drone. Finally, when the drone is in correct alignment in the desired predetermined position, it can be easily coupled, without the need for personnel, to other devices, such as a loading/unloading station, devices for refueling the drone, devices for charging the drone's batteries, devices for replacing the battery, etc.

One aspect of the present invention relates to the automatic loading or unloading of a drone on a landing/take-off site, where preferably one or more loading/unloading stations of a transport system are provided. The loading/unloading stations are connected to the transport system and are further configured to be functionally coupled to a drone when the drone is positioned at the predetermined position adjacent to the loading/unloading station. This may enable a shipment to be transferred from the drone (unloading), which is automatically and precisely positioned and aligned at the loading/unloading station, to the transport system via the loading/unloading station, or a shipment to be transferred from the transport system to the drone (loading) via the loading/unloading station.

For example, a preferred transport system may include a commonly known pneumatic tube system or a pneumatic tube facility, in which transport containers (pneumatic tube capsules) are transported through tubes of the pneumatic tube system using air pressure. However, other transport facilities can also be used, such as rail systems, belt conveyors, roller conveyors, etc.

The present invention can thus be used to improve the logistical connection of a drone to one or more transport systems. The positioning system according to the invention enables a shipment to be transported from a consignor at the point of origin via a first transport system to a first loading/unloading station, where the shipment is automatically loaded into a drone that is precisely coupled to that loading/unloading station in correct alignment by the positioning system. Subsequently, the drone is uncoupled from the loading/unloading station, and the shipment is then transported by the drone to the destination, where the drone lands on an associated landing/take-offing site, where the drone is coupled automatically and precisely to an associated loading/unloading station, preferably by means of another positioning system. Here, the drone can be automatically unloaded, and the shipment can then be transported to the consignee via a second transport system.

The destination can be, for example, a parcel packing station, wherein the shipment is picked up from the consignor by a drone and is unloaded at a parcel packing station equipped with a positioning system and an unloading station. The positioning system and the unloading station may be provided, for example, on the roof of the parcel packing station. The parcel packing station may be provided with an internal transport system to transport the shipments to the corresponding mailboxes (consignees).

Preferably, drones can be used to connect multiple stationary pneumatic tube systems or similar transport systems. By means of these transport systems (and the connected loading/unloading stations) in conjunction with the positioning systems according to the invention, a considerable simplification of the use of drones for transport tasks is achieved, since the transport of a shipment from the consignor to the consignee is essentially fully automatic. Thus, a significant advantage of the present invention is that existing stationary pneumatic tube systems (e.g., pneumatic tube system of multiple locations of a clinic and a laboratory) can be connected by the proposed concept using drones, wherein the drones can be coupled automatically and precisely with the loading/unloading stations of the pneumatic tube systems in a simple way using the positioning system according to the invention, so that the drones can be loaded and unloaded automatically.

The positioning system according to the invention can further be used to automatically and precisely couple a drone, for the purpose of replacing or charging the drone's batteries, refueling the drone, changing a shipment from one drone to another drone, etc., with a corresponding device, such as the loading/unloading station of a transport system, a device for refueling the drone or charging the drone's battery, etc., provided at a landing/take-off site. As described above, the drone lands for this purpose on a landing area of a landing/take-off site, and is "captured" by means of the positioning system according to the invention, and is moved or pushed with desired orientation into a predetermined position relative to the corresponding device. In addition to the precise position, the correct orientation of the drone is also important so that, for example, a loading/unloading means of the loading/unloading station can be coupled directly to, for example, the loading hatch of the drone, or a charging connector or fuel filler neck can be connected directly to the associated charging port or tank opening of the drone.

The preferred embodiments of the positioning system according to the invention work with one or more rope slings as a catch mechanism. If a drone lands on the loading area of the landing/take-off site within a rope sling, and if this rope sling is retracted (tightened), then the drone is automatically and precisely pulled to a predetermined position at or adjacent to a loading/unloading station or one of the above-described devices, and is thereby correctly aligned. Preferably, only a single actuator (e.g., a rope winch) is required for the actual retraction process of the rope sling. In preferred embodiments, the orientation of the drone on the ground (i.e., on the landing area or landing surface of the landing/take-off site) immediately after landing of the drone is arbitrary, allowing for simplified and efficient landing procedures, e.g., aligned with the wind. Correct alignment of the drone on the landing area is achieved by means of the positioning system according to the invention. To bring the positioning system back to its initial position, after the drone takes off, a reversing system is used, which can be implemented differently from the actual positioning system. For example, additional rope winches or other mechanical systems can be used to implement the reversing system.

The function of moving and automatically positioning the drone is enabled by differently designed drone undercarriage (feet). Two types of feet are used, namely "rope-passing" and "rope-catching", as will be described in detail below.

Furthermore, systems with multiple or differently moving ropes or rope slings, or even with movable catch rods, can be used if the geometry or design requires it.

If a sufficiently smooth and level landing surface (e.g., a helicopter landing area) is available, the installation of the system according to the invention can be carried out very quickly and in a simple manner, since only a few components have to be installed. Thus, it is possible to use the system according to the invention in a mobile and temporary manner, which was hardly possible with the previous solutions. A smooth landing surface can also be achieved by laying out sheets or foils.

Also, due to the smaller number of components and their simple design, a higher robustness against environmental influences is given. Therefore, no elaborate protection against environmental influences is required.

Aspects of the present invention are defined in the following clauses:

Clause 1: A system for automatically positioning a drone on a landing/take-off site comprising a landing area defined by an outer boundary,
  wherein the system is configured to position and align a drone, landed at any location on the landing area, at a predetermined position on the landing area,
  wherein the system comprises a rope sling which, in its initial position, extends substantially along the outer boundary of the landing area, and the ends of which are connected to a rope winch located near or at the predetermined position so that the rope sling can be retracted upon actuation of the rope winch, and
  wherein the drone is provided with engagement means configured to engage the rope sling upon retraction of the rope sling so that the drone is pulled to and correctly oriented in the predetermined position upon further retraction of the rope sling.

Clause 2: A system for automatically positioning a drone according to clause 1, wherein the system comprises return means configured to deploy a rope sling on the landing/take-off site to its initial position such that the rope sling extends substantially along the outer boundary of the landing area and substantially encloses the entire landing area.

Clause 3: A system for automatically positioning a drone according to any one of the preceding clauses, wherein the drone comprises at least three feet, wherein at least one of the feet is configured such that the rope sling slips under said at least one (rope-passing) foot when the rope sling is retracted, and wherein at least one of the feet is configured as an engagement device such that said at least one (rope-catching) foot engages the rope sling when the rope sling is retracted, to pull the drone into the predetermined position upon further retraction of the rope sling, wherein optionally at least one of the feet is configured to engage with guide elements and to be guided by said guide elements which are provided on the landing area of the landing/take-off site, and wherein optionally at least one of the feet is provided with additional elements that can interact with the guide elements to enable further functions.

Clause 4: A system for automatically positioning a drone according to clause 3, wherein the at least one rope-passing foot of the drone is provided in its lower portion with a tapering configured to engage with the rope sling, and wherein the at least one rope-catching foot is rounded at its lower end, such that the rope sling can slip under the foot when the rope sling is retracted, wherein optionally an additional component is provided at the drone that does not contact the ground of the landing/take-off site and is configured to engage with an element attached to the rope sling.

Clause 5: A system for automatically positioning a drone according to any one of clauses 1 and 2, wherein the drone comprises at least three feet, wherein at least one of the feet is configured to engage with the rope sling in a first configuration, and to allow the rope sling to slip under its rounded bottom in a second configuration, wherein said at least one foot being provided with fold-out gripping means folded down in said first configuration and folded up in said second configuration, or wherein said at least one foot comprises a vertically displaceable sleeve provided with an outwardly projecting flange at the lower end.

Clause 6: A system for automatically positioning a drone according to any one of the preceding clauses, wherein the system comprises pusher means coupled to the rope winch to enable the drone to be pushed back towards the center of the landing area.

Clause 7: A system for automatically positioning a drone according to any one of the preceding clauses, wherein at least two further rope winches are provided which are spaced substantially along the outer boundary of the landing area, connected to the rope sling via associated ropes and configured to return the rope sling to its initial position such that the edges of the returned rope sling substantially extend along the outer boundary of the landing area, wherein the ropes of the rope winches are slidably connected to the rope sling, optionally via rings.

Clause 8: A system for automatically positioning a drone according to any one of the preceding clauses, wherein, spaced substantially along the outer boundary of the landing area, at least two attachment points are provided to which are attached first ends of elastic elements whose second ends are respectively connected, preferably slidingly or by rings, to the rope sling, in order to return or to spread out the rope sling to its initial position by action of the elastic elements, such that the edges of the spread-out rope sling substantially extend along the outer boundary of the landing area, wherein the elastic elements are selected from a group comprising rubber bands, springs and spring-tensioned winches.

Clause 9: A system for automatically positioning a drone according to any one of the preceding clauses, wherein an additional winch is provided substantially at the outer boundary of the landing area for retracting at least one traction rope, wherein two or more ends of the traction rope are attached to the rope sling via pulleys provided spaced apart substantially along the outer boundary of the landing area, such that the rope sling can be spread out by operating the additional rope winch such that the edges of the spread-out rope sling substantially extend along the outer boundary of the landing area.

Clause 10: A system for automatically positioning a drone according to any one of the preceding clauses, wherein a ring track is provided around the landing area, on which at least three pulleys movable in a mechanical manner along the ring track are provided, which pulleys are coupled to the rope sling, wherein the rope sling can be spread out by moving the pulleys, such that the edges of the spread-out rope sling substantially extends along the outer boundary of the landing area.

Clause 11: A system for automatically positioning a drone according to any one of the preceding clauses, wherein there are provided two rope winches spaced apart substantially along the outer boundary of the landing area and each provided with an associated rope sling, wherein the rope slings each engaging a predetermined foot of the drone, when the rope slings are retracted, to move the drone to the predetermined position.

Clause 12: A system for automatically positioning a drone according to clause 1, wherein the rope winch is in communication with a loading/unloading station of a transport system to enable the drone to be loaded/unloaded with a shipment delivered via the transport system, and wherein the rope winch is optionally integrated with the loading/unloading station, and/or
   wherein the rope winch is connected to a refueling facility for refueling the drone and/or to a charging station for charging a battery of the drone.

Clause 13: A system for automatically positioning a drone according to any one of the preceding clauses, wherein the rope winch is provided with a guide means configured to engage with corresponding guide means provided at or in the drone to further precisely position and align the drone when the drone approaches the rope winch, and/or wherein the drone has at least three feet, wherein at least one of the feet is configured to engage with and to be guided by guide elements provided on the landing area of the landing/take-off site such that, when said at least one foot engages with the rope sling during retraction of a rope sling by the rope winch, the drone can be precisely positioned and aligned as the rope sling is further retracted.

Clause 14: A system for automatically positioning a drone on a landing/take-off site having a landing area defined by an outer boundary,
   wherein the system is configured to position and align a drone landed at any location on the landing area at a predetermined position on the landing area,
   wherein the landing area is surrounded by two separate, partially overlapping ring tracks such that the landing area is substantially enclosed by at least one of the ring tracks,
   wherein a respective movable element is provided at each of the two ring tracks which is movable along the respective ring track, wherein each of the two elements being connected to one end of an associated rope, wherein the other end of each rope being connected to an associated rope winch,
   wherein the ropes are displaced by movement of the elements in combination with actuation of the rope winches so as to engage with engagement means provided at the drone, such that the drone is moved to the predetermined position upon further displacement of the ropes.

Clause 15: A system for automatically positioning a drone according to any one of the preceding clauses, wherein a drone parking device is provided in the region of a rope winch, the parking device being configured to allow one or more drones to be removed from the landing area, parked, and moved back onto the landing area.

Clause 16: A system for transporting various goods from a point of origin to a remote destination by using a drone in combination with at least one stationary transport system and at least one system for automatically positioning a drone on a landing/take-off site according to any one of the preceding claims, wherein the at least one transport system is in communication with at least one loading/unloading station.

The present invention and the various aspects of the invention will now be described by means of embodiments with reference to the figures, on the basis of which exemplary embodiments of the system according to the invention for automatically positioning a drone on a landing/take-off site, a reversing system and further aspects of the invention will be explained. However, the present invention is not limited to these embodiments. For example, the various aspects of the invention may also be implemented with other types of devices that are intended to be related in some manner to a drone landed on a landing/take-off site.

BRIEF DESCRIPTION OF THE DRAWING FIGURES

In the Figures, it is illustrated:

FIGS. 1a-1d are schematic representations of the general mode of operation of the system according to the invention for positioning a drone landed on a landing/take-off site;

FIGS. 3a and 3b are schematic representations of exemplary sliding feet of a drone, wherein FIG. 3a shows a "rope-catching" variant and FIG. 3b shows a "rope-passing" variant;

FIGS. 3c and 3d are schematic representations of exemplary rolling feet of a drone, wherein FIG. 3c shows the "rope-catching" variant and FIG. 3d shows the "rope-passing" variant;

FIGS. 6a-6c are further preferred embodiments of the positioning system of the present invention;

DETAILED DESCRIPTION OF THE PREFERRED EMBODIMENT

Figure 2A:
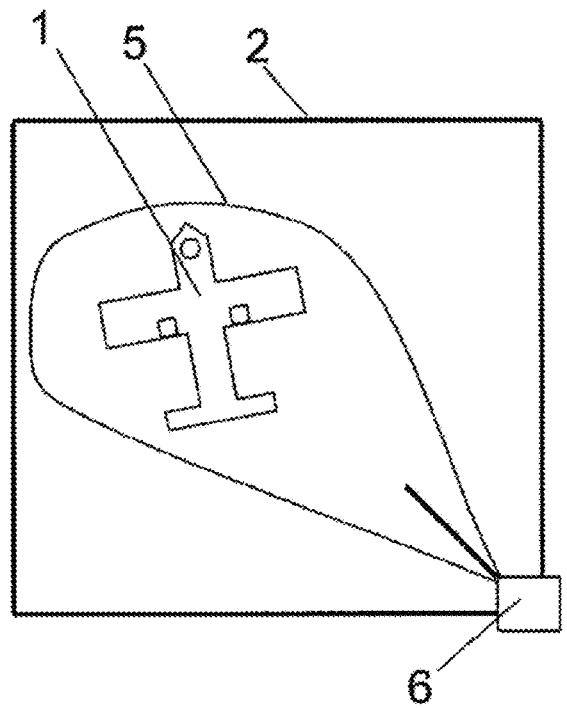
FIGS. 2a-2c are schematic representations of an alternative mode of operation of the system according to the invention for positioning a drone landed on a landing/take-off site.

As shown in FIGS. 1a-1d, a drone 1 is landed on the landing/take-off site 2. The landing/take-offing site or landing surface for the drone can theoretically be of any size and shape, although the size depends on the size of the drones used and on external influences. For example, the landing area must be larger if weather conditions are generally rather unfavorable, since accurately landing of the drone is not possible in strong winds, for example. For example, if a drone has a diameter of 100 cm, the landing area should have a size of at least 10 m², preferably 50 m² and even more preferably 100 m². If a larger drone is used, the landing area should be correspondingly larger. The landing surface may in principle have any shape, but preferably has a substantially rectangular, polygonal or substantially circular shape.

In an exemplary embodiment, the drone 1 has three feet 3 and 4. Depending on the size and type of the drone, a different number or type of feet may be used.

As shown in FIG. 1a, a rope sling 5 is laid out on the landing/take-off site 2. In the initial position (not shown), the rope sling extends substantially along the outer boundaries of the landing area of the landing/take-off site 2 and preferably encloses substantially the entire landing area of the landing/take-off site. Consequently, the landing area is defined by the rope sling 5, which is laid out by means described below. The size of the landing area can thus be varied, depending on the size of the drone and external conditions (e.g. wind). Consequently, when the drone 1 lands on the landing area of the landing/take-off site 2, all of the drone's feet are located on the landing area enclosed by the rope sling.

As shown in FIGS. 1a and 1b, the rope sling 5, one end or both ends of which are connected to and can be pulled in by a rope winch 6, is slowly retracted (in FIG. 1a, the rope sling 5 is already slightly retracted). The rope winch 6 is preferably located essentially at the outer boundary of the landing area. The rope sling 5 and the rope winch 6 together form a kind of catch mechanism. The two rear feet or landing gears 3 of the drone 1 are preferably designed such that the rope sling 5 slips under these two feet (see FIGS. 3b and 3d) when the rope sling is retracted. The front foot 4 (see FIGS. 3a and 3c) of the drone, on the other hand, is designed to capture the rope sling 5. The rope sling thus engages the front foot 4, so that, when the rope sling is further retracted, the drone is pivoted slightly and pulled toward the rope winch 6. This process is illustrated in FIGS. 1c and 1d.

As further shown in FIG. 1b, the rope winch 6 is connected, for example, to the loading/unloading station 7 of a transport system (not shown in more detail). The rope winch is preferably integrated with the loading/unloading station. Preferably, the rope winch 6 is provided with a guide means 8 configured to more precisely position and align the drone 1 as the drone approaches the rope winch by engaging the guide means 8 with corresponding means provided at the drone. For example, the guide means 8 may be a rod that engages with a guide track or guide tube in or at the drone. Alternatively or additionally, the guide means may have guideways or guide channels provided and configured on the landing area to engage with, for example, the front foot of the drone, as will be explained in more detail below. As shown in FIG. 1d, the drone is in the correct predetermined position and orientation with respect to the rope winch 6 and the loading/unloading station 7, in order to now load the drone with a shipment supplied via the transport system, or to be able to unload the drone, wherein the shipment being removed from the drone by means of an associated device and transported further to the destination via the transport system. The guide means 8 may also be implemented by a tube, which is configured and dimensioned to load or unload, for example, a pneumatic tube capsule into or out of the drone. Alternatively, the rope winch 6 may be connected with a refueling system, in which case the guide means 8 may also serve as a fueling tube. In another alternative, the rope winch 6 may be provided with a battery charging station, in which case a charging plug may be provided on the guide means 8.

As explained above and shown in FIGS. 1c and 1d, the drone is pivoted through approximately 45° and pulled into approximately correct alignment with the loading/unloading station 7 by means of the tightening rope sling 5 engaged with the front foot 4 of the drone. As the drone continues to approach the rope winch 6, the orientation of the drone relative to the loading/unloading station 7 can be further corrected as the guide means 8 increasingly engages the associated guide means of the drone.

After the drone has been loaded or unloaded with a shipment via the loading/unloading station 7, refueled, or the drone's batteries have been charged or replaced, the guide means 8 can be disengaged from the drone's associated guide means and/or the drone can be pushed back toward the center of the landing area of the landing/take-off site by means of a pusher device not shown in more detail or by means of a return winch described in more detail below, to subsequently take off again. It is obvious that the guide means 8 (in combination with, for example, a fueling pipe or a charging power supply) may also be arranged at a different position, depending on where the tank opening or the charging socket is located at the drone. In either case, the guide means 8 engages with corresponding means at the drone to correct the position and orientation of the drone—if necessary.

Figure 2B:
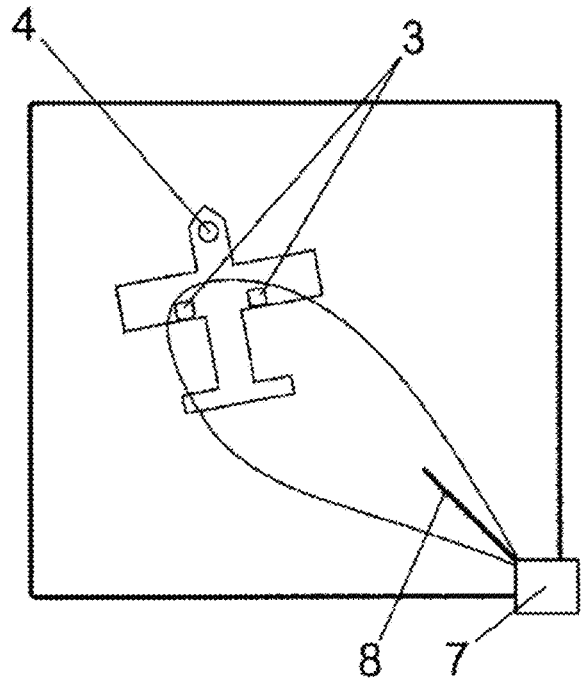
Figure 2C:
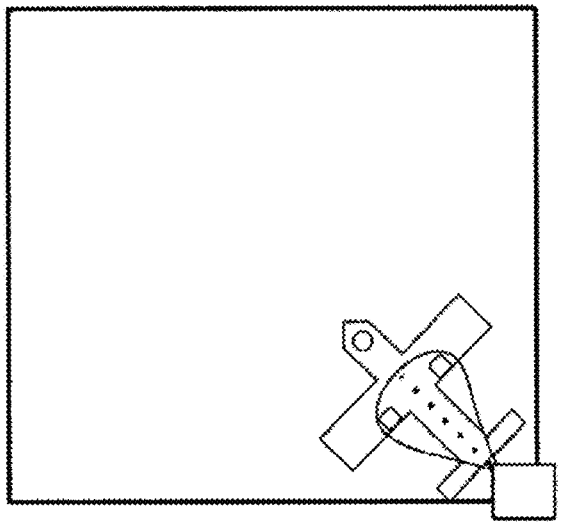

FIGS. 2a-2c show a slightly modified solution in which a drone is landed on the landing area of the landing/take-off site 2. The drone 1 has three feet 3 and 4, which may have different configurations. As shown in FIG. 2a, a rope sling 5 is laid out on the landing/take-offing site 2, wherein the rope sling, in the initial position, substantially extends along the outer boundaries of the landing area of the landing/take-off site 2 and preferably substantially encloses the entire area of the landing/take-off site. As explained above, the landing area is defined by the fully deployed rope sling. When the drone lands on the landing area, all three feet of the drone are within the area enclosed by the rope sling.

As shown in FIGS. 2b and 2c, when the rope sling 5, the ends of which are connected to a rope winch 6, is retracted by the winch, the rope sling 5 slips under the front foot 4 and engages with the rear feet 3, so that the drone is slightly pivoted and pulled toward the rope winch 6 as the rope sling is further retracted. In contrast to the solution of FIGS. 1a-1d, where the nose of the drone is pulled towards the rope winch 6 or the loading/unloading station 7, in the solution of FIGS. 2a-2c, the tail of the drone is pulled towards the cable winch 6 or the loading/unloading station 7. This option can be chosen when the drone 1 needs to be loaded/unloaded or refueled from the rear. Obviously, other configurations are also possible; it is only important that at least one of the feet is configured to engage with the rope sling 5 when it is retracted. Preferably, the drone should roughly control its orientation upon landing (i.e., the tail of the drone should be at an angle <90° to the winch immediately after it lands).

As shown in FIGS. 2a-2c, the winch 6 is also here connected, for example, to a loading/unloading station 7 which is provided with a guide means 8 configured to engage with associated guide means at or in the drone. Also in this solution, after the drone is loaded/unloaded with a shipment, it can be pushed back towards the center of the landing/take-off area by means of a pusher device or a return winch in order to be able to take off again.

Figure 3A:
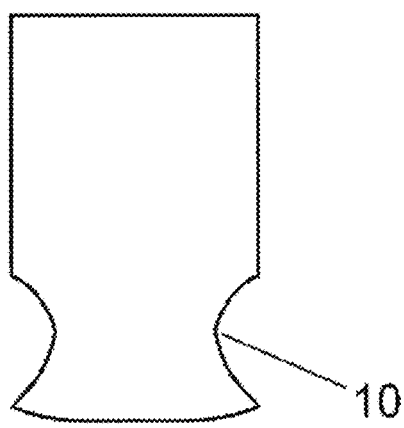
Figure 3B:
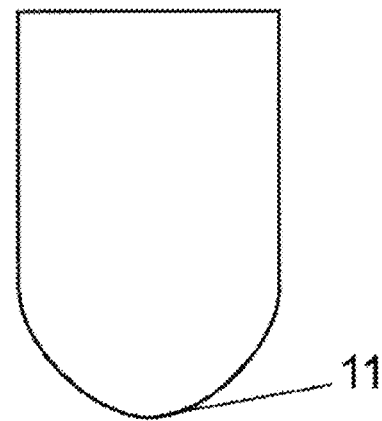
Figure 3C:
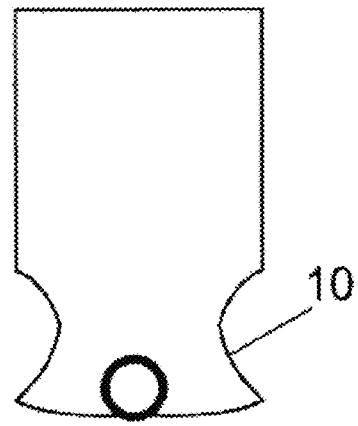
Figure 3D:
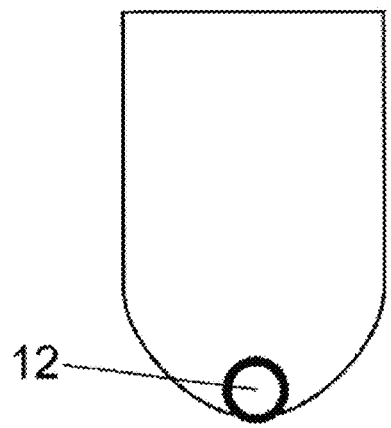
Figure 3E:
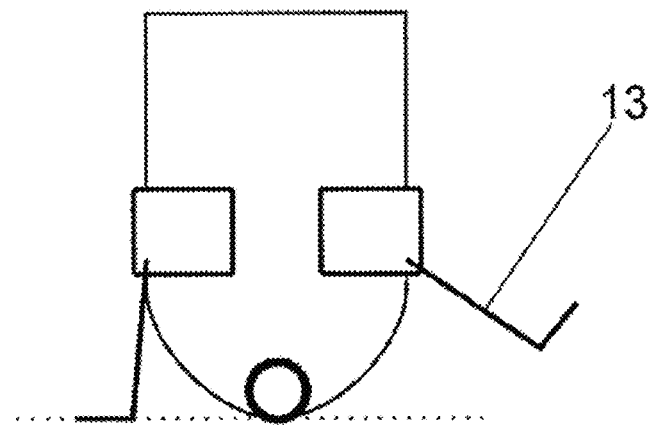
FIG. 3e is a schematic representation of an exemplary rolling foot of a drone.

FIGS. 3a-3e show different embodiments of the feet 3, 4 of the drone shown in FIGS. 1a-1d and 2a-2c. As shown in FIG. 3a, the foot is provided with a tapering or recess 10 in its lower portion, which is designed to be able to engage with the rope sling 5 of the positioning system when the rope sling is retracted, whereas the foot shown in FIG. 3b is rounded at its lower end 11, so that when the drone has landed on the landing area, the rope sling can slip under the foot when the rope sling is retracted. The embodiments of FIGS. 3c and 3d differ from those of FIGS. 3a-3b only in that the feet are provided with a roller or roller element 12 on their underside. The foot shown in FIG. 3e is a general-purpose drone foot designed to engage with the rope sling in a first configuration and to allow the rope sling to slip under the rounded underside in a second configuration. For this purpose, the foot is provided with fold-out gripping means 13. In the first configuration the gripping means 13 are folded down, and in the second configuration the gripping means 13 are folded up. It is apparent that other means may be provided instead of the foldable gripping means, such as a vertically slidable sleeve provided with an outwardly projecting flange at the lower end. Alternatively, the drone may be provided with one or more gripping arms that can be activated (e.g., extended downward) after the drone lands to engage with the retracting rope sling. Further, the force of the rope sling, when engaging with the rope-catching foot of the drone, can be used to initiate operations, such as releasing a braking device of the drone.

Figure 4:
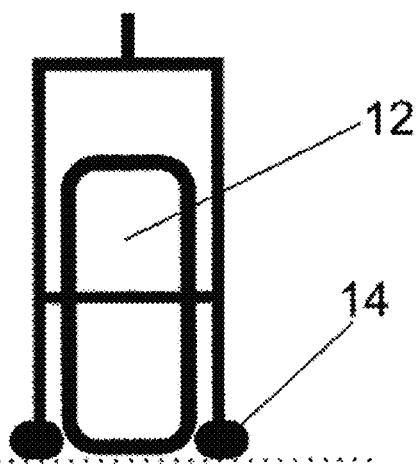
FIG. 4 is a schematic representation of an alternative embodiment of a foot provided with a wheel.

FIG. 4 shows an alternative embodiment of a foot provided with a roller 12, which has gripping means 14 that can engage with the rope sling of the positioning system. The gripping means 14 can be removed so that in this configuration the rope sling can slip under the roller. Alternatively, the gripping means can be slid vertically upward.

FIGS. 5a-5d show preferred embodiments of the rope sling system, and in particular the rope sling reversing system, of the drone positioning system of the present invention.

Figure 5A:
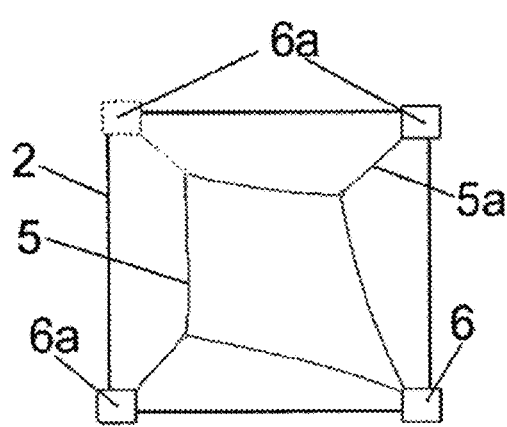
FIGS. 5a-5d are preferred embodiments of a rope sling system of the positioning system of the present invention with "reversing function"

In the embodiment of FIG. 5a, three or four rope winches 6, 6a (preferably one rope winch at each corner of the landing/take-off site 2) are provided, two or three rope winches 6a being intended to "spread out" the rope sling, resp. to its initial position, so that the edges of the extended rope sling 5 preferably extend approximately along the outer boundaries of the landing/take-off site 2, thereby defining the landing area, and the rope winch 6 is used to retract the rope sling 5 in order to pull a drone landed on the landing area of the landing/take-off site in the direction of that rope winch 6 and to position the drone precisely and to align the drone precisely. The ropes 5a of the cable winches 6a for spreading out or reversing the rope sling 5 are preferably connected to the rope sling 5 in a displaceable manner via rings. As can be seen from FIG. 5a, the rope sling 5 is laid out by the rope winches 6a (reversing winches) pulling in their respective rope 5a essentially completely. In this process, the rope of the rope winch 6 (retraction winch) is dispensed freely. For the retraction process, this process is reversed, i.e. the return winches 6a release (actively or passively) their rope 5a, whereas the retraction winch 6 retracts the rope sling 5, thus performing the positioning process described above. Releasing the rope can be done by controlling the winches or by additional methods, such as a clutch mechanism. The retraction winch 6 may, for example, be provided with a loading/unloading station and/or with means for charging the drone's batteries.

Figure 5B:
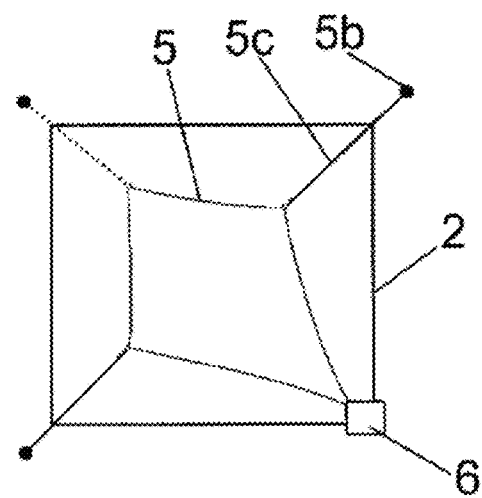

In the embodiment shown in FIG. 5b, only one rope winch 6 is provided (preferably at one corner of the landing/take-offing area), wherein attachment points 5b for rubber bands 5c being provided near the other corners or on a line extending from the other corners of the landing/take-off site, the other ends of which are each displaceably connected, preferably by rings, to the rope sling 5. By the action of the rubber bands, which are preferably provided at the (three) corners of the landing/take-off site where the winch 6 (retraction winch) is not located, the rope sling is "spread out" so that the edges of the spread-out rope sling approximately extend along the outer boundaries of the landing/take-off site, thus defining the landing area. Other elastic elements may be used instead of rubber bands, such as passively retracting elements (e.g., springs or spring-tensioned winches). The rope winch 6 can be used to retract the rope sling in order to pull a drone landed on the landing/take-off site to this winch 6 for accurate positioning or alignment. This winch can be provided, for example, with a loading/unloading station and/or with a device for charging the batteries of the drone.

Figure 5C:
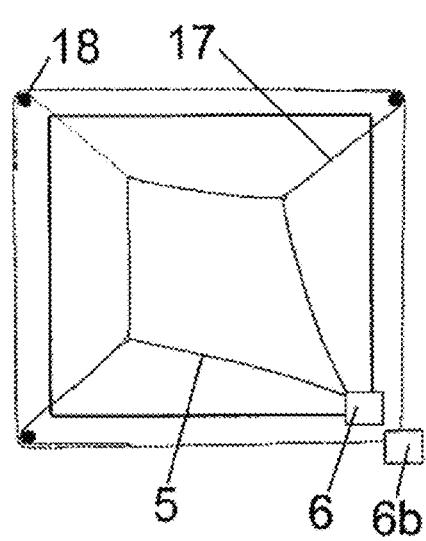

In the embodiment shown in FIG. 5c, a winch 6b is provided (preferably at one corner of the landing/take-off site), whereby reversing ropes 17 are attached to the rope sling, wherein the reversing ropes are connected to the winch 6b (reversing winch) via pulleys 18 provided near the other corners of the landing/take-off site. This connection can be made directly for each return rope 17 or through a common guide rope. By operating the winch 6b, the rope sling 5 can be "spread out" so that the edges of the spread-out rope sling approximately extend along the outer boundaries of the landing/take-off site. When multiple reversing ropes 17 are directly connected to rope winch 6b, the drums of the rope winch may be of different sizes for each reversing rope 17 to compensate for the different lengths of the reversing ropes 17. Another rope winch 6 (retraction winch) may be used to retract the rope sling to pull a drone landed on the landing/take-off site to said rope winch for accurate positioning or alignment. This rope winch 6 may, for example, be provided with a loading/unloading station and/or with a device for charging the batteries of the drone.

Figure 5D:
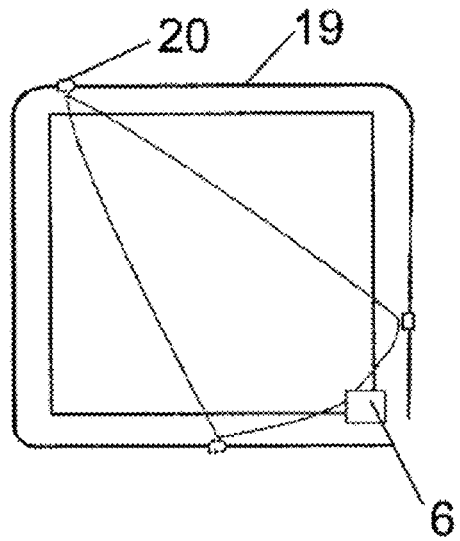

In the embodiment of FIG. 5d, a rope winch 6 is provided (preferably at a corner of the landing/take-off site), wherein a ring track 19 is provided around the landing/take-off site, on which three or more circulating rollers 20 are provided, which can be moved in a mechanical manner along the ring track 19. By moving the rollers 20 to the corners of the ring track 19, the rope sling can be "spread out" so that the edges of the spread-out rope sling approximately extend along the outer boundaries of the landing/take-off site. As explained above, both the landing/take-off site and the actual landing area can be of any shape, from which it is obvious that the number of circulating rollers depends on the size and shape of the landing/take-off site and the landing area, respectively. The winch 6 can be used to retract the rope sling 5 in order to pull a drone that has landed on the landing/take-off site to this winch for accurate positioning or alignment. This rope winch may, for example, be provided with a loading/unloading station and/or with a device for charging the batteries of the drone.

FIGS. 6a-6c show further preferred embodiments of the drone positioning system of the present invention.

In FIG. 6a, two rope winches 6 are used, wherein said rope winches are arranged at two adjacent corners of the landing/take-off site, and wherein each of said rope winches is provided with a rope sling 5. The rope winches 6 and the associated rope slings 5 are configured to move a drone with correct orientation to a precise position. Similar to the embodiments of FIGS. 1a to 1d, in the embodiment of FIG. 6a, a guide means 8 is also provided to allow the drone to be aligned even more precisely (again, the guide means may be provided with means for refueling or charging the drone's battery). The feet of the drone have already been described with reference to the previous figures. The rope slings may be returned to their original position after the drone has lifted off by procedures as described with reference to FIGS. 5a to 5d.

FIGS. 6b and 6c show an alternative embodiment for automatically positioning a drone. In this embodiment, the landing/take-off site is surrounded by two separate, partially overlapping ring tracks 21, 22 such that, for example, three of the four edges of the landing/take-off site are enclosed by at least one of the ring tracks. In other forms of the landing/take-off site, other designs of the ring tracks are possible. It is important that a substantial portion of the perimeter of the landing/take-off site is enclosed by one or both of said ring tracks. On each of the two ring tracks 21, 22, there is provided a respective movable element 23 which can be moved along the respective ring track 21, 22. Each of the two elements 23 is connected to an associated rope 24, the other end of each rope 24 being connected to an associated rope winch 6. As shown in FIGS. 6b and 6c, by moving the elements 23 in combination with a corresponding actuation of the rope winches 6, the ropes 24 can be displaced so as to engage with a desired foot of the drone, and in this way to pull the landed drone to a desired position (e.g., between the two rope winches) where it can be accurately aligned or positioned. For example, a loading/unloading station and/or a device for charging the drone's batteries may be provided between the two winches.

Figure 7A:
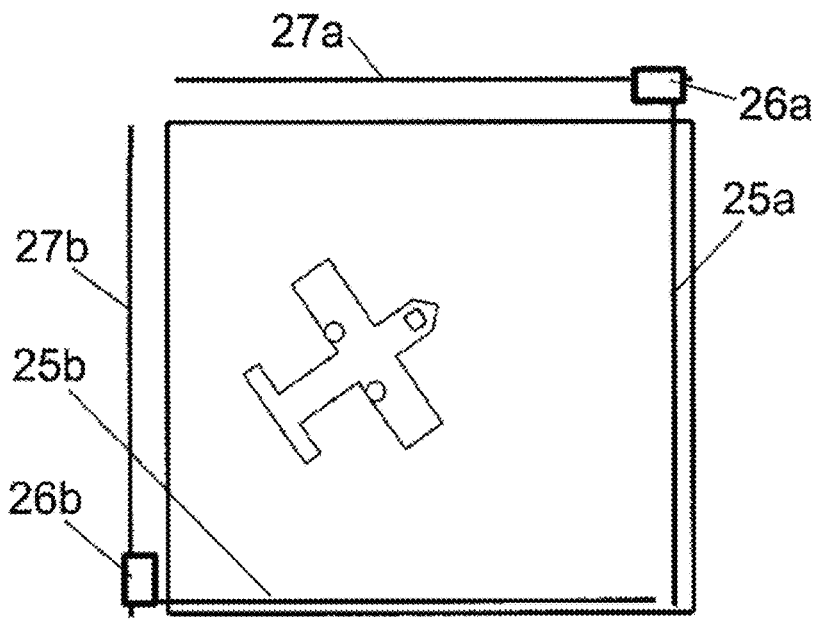
FIGS. 7a-7c are further alternative embodiments of the positioning system of the present invention.
Figure 7B:
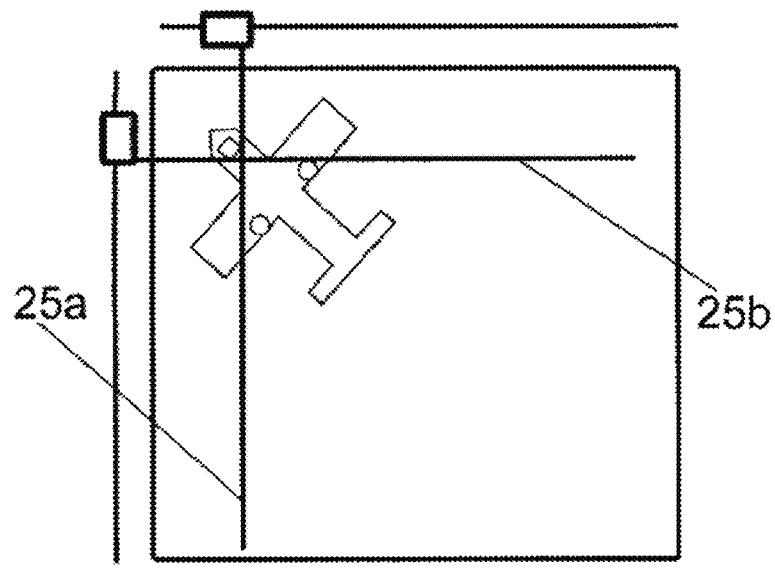
Figure 7C:
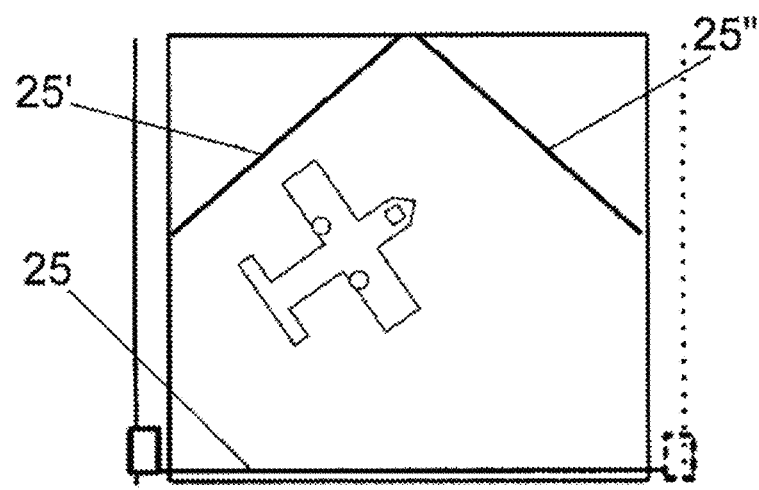

FIGS. 7a to 7c show embodiments that are alternatives to a rope sling. In FIGS. 7a and 7b, positioning is performed by two independently moving catching elements 25a and 25b, which are preferably straight elements. These elements can be implemented by ropes (driven from both sides—not shown) or by rigid elements, such as tubes or rods. The elements 25a and 25b are moved by movable means 26a and 26b, which are preferably guided by associated rails 27a and 27b, respectively. After landing anywhere on the landing area of landing/take-off site (see FIG. 7a), the drone is positioned by the elements 25a and 25b in the upper left corner, where again a loading/unloading station (not shown) may be provided.

In FIG. 7c, the positioning is realized by a combination of catch elements 25 as described above and guide elements 25', 25". By means of these elements, the drone is moved to the upper middle position.

Figure 8A:
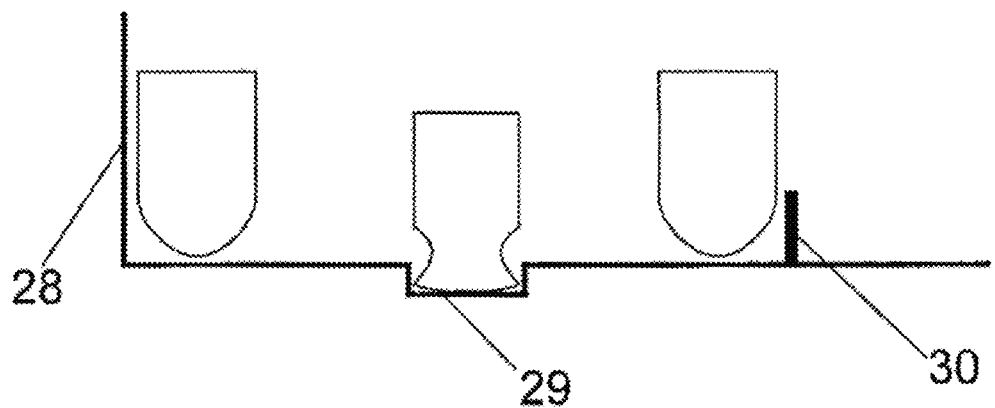
FIGS. 8a and 8b are schematic representations of further aspects for positioning and aligning a drone near the final predetermined position of the drone.
Figure 8B:
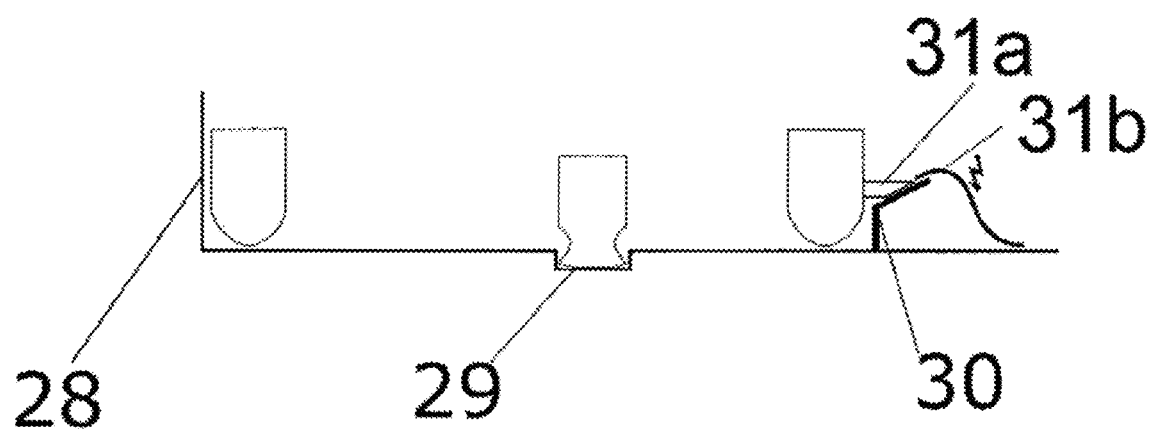

As shown in FIG. 8a, further elements can be used on the landing area of the landing/take-off site to guide the feet, in particular in the region near to the retraction winch 6 for fine positioning when retracting the drone and for guiding when "pushing back" the drone back to the take-off position, if this occurs. For example, it is possible to provide various guiding elements in the form of walls 28, channels 29 and guide elements 30. These guide means may be provided alternatively or in addition to the guide means 8 shown in FIGS. 1a-1d and 2a-2b. In this context, as shown in FIG. 8b (see right figure), the feet may be provided with additional elements 31a that interact with guide elements 30 provided on the landing area of the landing/take-off site, thus enabling functions such as raising the foot or connecting the foot of the drone to a sensor or power connector 31b, thus charging a battery of the drone. Areas with different properties of the surface 2, such as variable friction properties, can also be used to influence the movement of the drone.

Figure 9A:
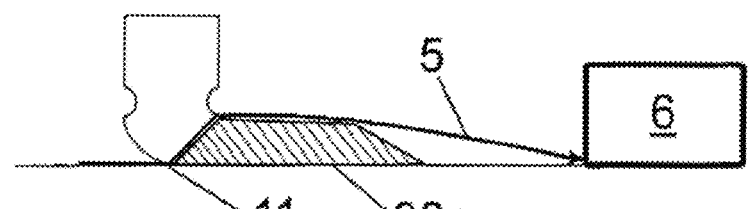
FIGS. 9a and 9b are schematic representations of further aspects for retracting and returning a rope sling of the positioning system.
Figure 9B:
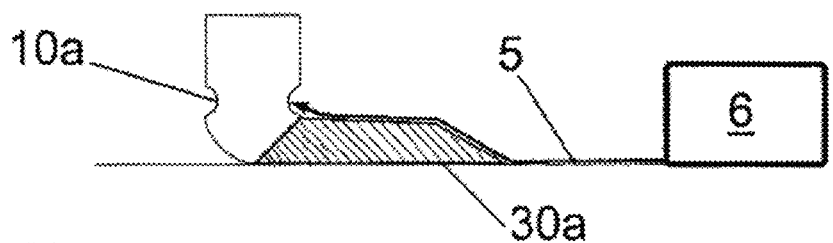
Figure 9C:
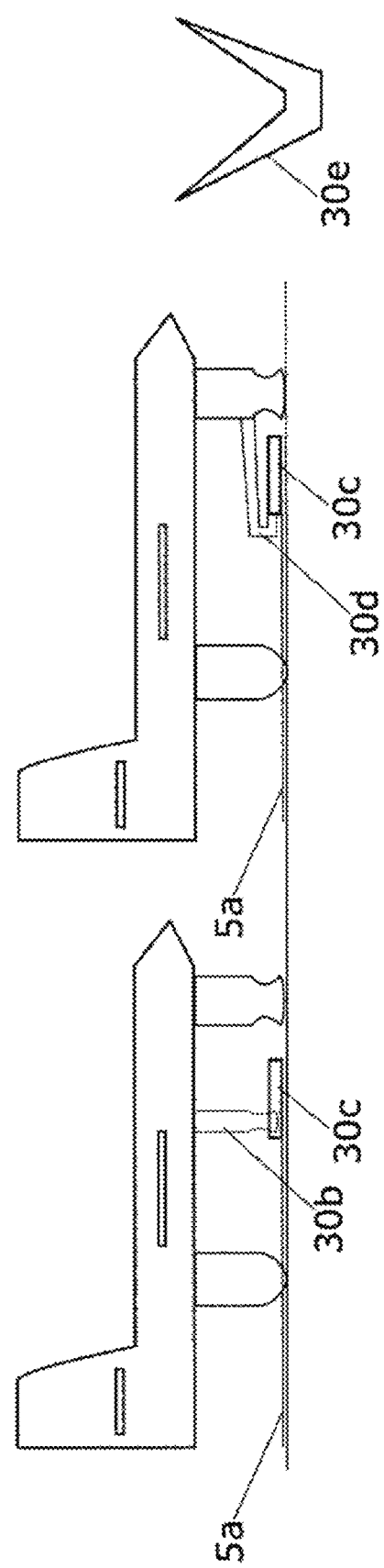
FIG. 9c is a schematic representation of further aspects for using the rope winches to move the drone to the take-off position.

As an additional embodiment of the positioning system previously described in particular with reference to FIGS. 1a-1d and FIGS. 2a-2c, positioning the drone back to its initial position (i.e., pulling the drone away from the retraction winch 6 or loading/unloading station 7) can also be accomplished by using reversing winches and associated rope slings. For this purpose, one or more feet of the drone that allow the rope to pass through during retraction (see FIGS. 3b and 3d) are provided with a higher recess or tapering 10a. When the drone is retracted, as shown in FIG. 9a, the rope sling 5 is retracted by means of a rope winch 6 (retraction winch) (from left to right in FIG. 9a) and slips under the rounded end 11 of the foot. The foot is in contact with a guide element 30a, which is beveled at both edges. When the drone is retracted (FIG. 9b), the rope sling is pulled in the opposite direction by another rope winch (return winch—not shown). Here, the rope sling slides from right to left over the guide element 30a and comes into engagement with the recess 10a. If the rope sling 5 is now pulled further to the left, the drone is now pulled "backwards" towards its take-off position on the landing/take-off site, where the drone can subsequently take off. Catching the rope in the recess 10a can also be realized by an additional element at the drone that does not touch the ground. Likewise, an additional component can be attached to the drone that does not touch the ground and thus does not interact with the capture rope (retraction rope) 5a. This component is preferably attached to the drone itself (see component 30b in the left figure of FIG. 9c) or to a foot (see component 30d in the middle figure of FIG. 9c). This component 30a/30d is configured to engage with a preferably V-shaped element 30c (see left and middle figures of FIG. 9c) mounted on a retraction rope 5a when the rope 5a is retracted. A top view of a preferred embodiment of this element 30e is shown in the right figure of FIG. 9c. This element 30c or 30e, which is attached to the retraction rope 5a, comes into engagement with the component 30b or 30d, respectively, when the rope 5a is retracted, thereby substantially improving the positioning of the drone to the take-off position. Obviously, the above operations require a coordinated control of all the winches. Preferably, the solution described with reference to FIG. 9c is used in combination with the guide elements shown in FIGS. 8a and 8b.

Figure 10A:
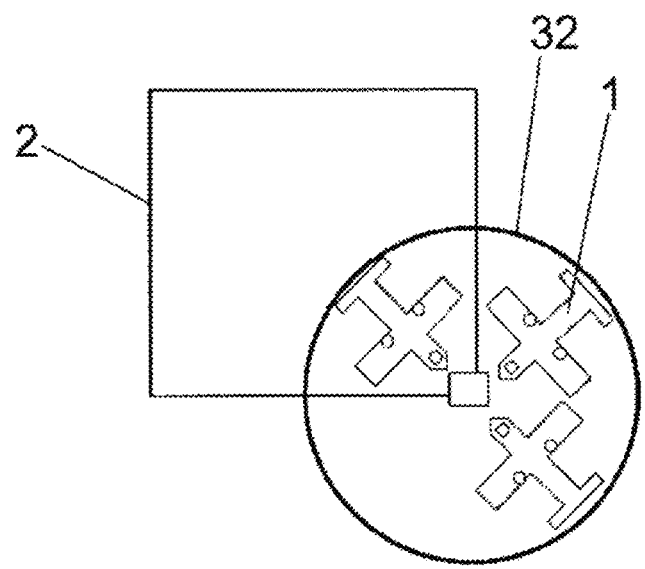
FIGS. 10a and 10b are schematic representations of a device for "parking" one or more drones.
Figure 10B:
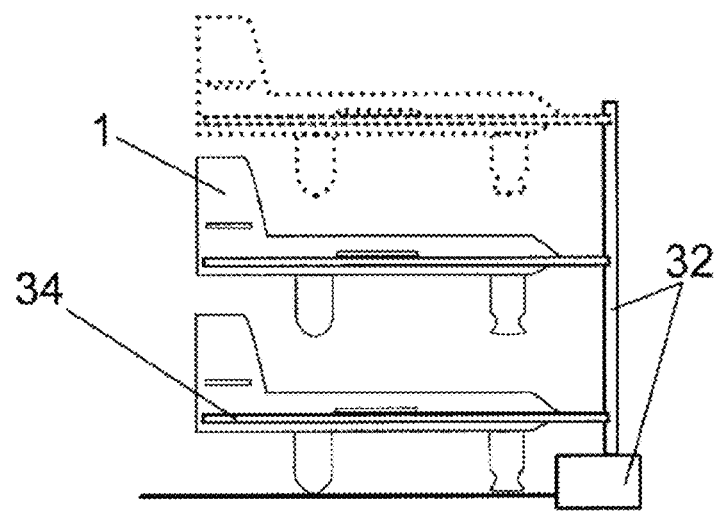

In order to hold or receive multiple drones during operation, a device 32 for parking drones 1 may be provided in the region of a winch or loading/unloading station. By means of the device 32, one or more drones can be removed from the landing/take-off site 2 and parked, and of course moved back again on the landing/take-off site. The device may be in the form of a rotatable parking device (see FIG. 10a) and/or in the form of a vertical storage (see FIG. 10b). As best shown in FIG. 10b, the drones are held by a type of holding rod 34. This holding rod 34 may correspond to the guide means 8 shown in FIGS. 1a-1d.

Figure 11:
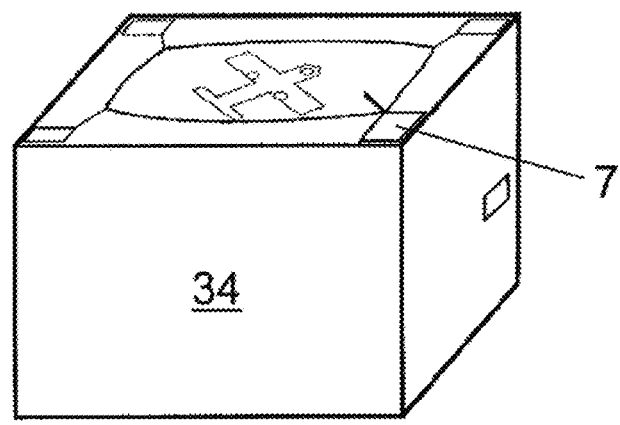
FIG. 11 is an exemplary implementation of the positioning system located on the roof of a parcel packing station.

In FIG. 11, the positioning system according to the invention is shown installed on the roof of a parcel packing station. As explained above, a shipment can be picked up from a consignor by means of a drone and unloaded at the parcel packing station 34 provided with an unloading station 7. In addition to the unloading station 7, a positioning system is provided on the roof of the parcel packing station 34, which may correspond, for example, to the system shown in FIG. 5a. The parcel packing station may be provided with an internal transport system to transport the items to the corresponding mailboxes (consignee).

Figure 12A:
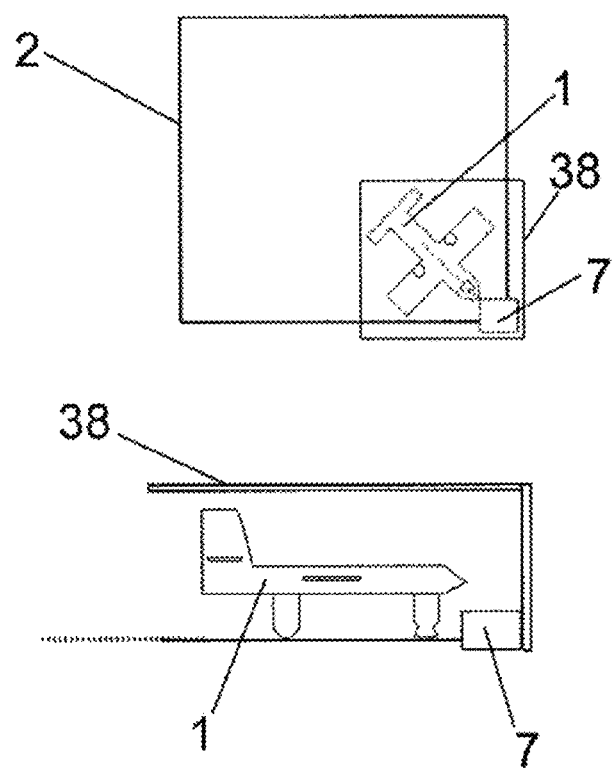
FIGS. 12a and 12b are exemplary devices for protecting a drone at the final predetermined position of the drone and for protecting of the entire system, respectively.
Figure 12B:
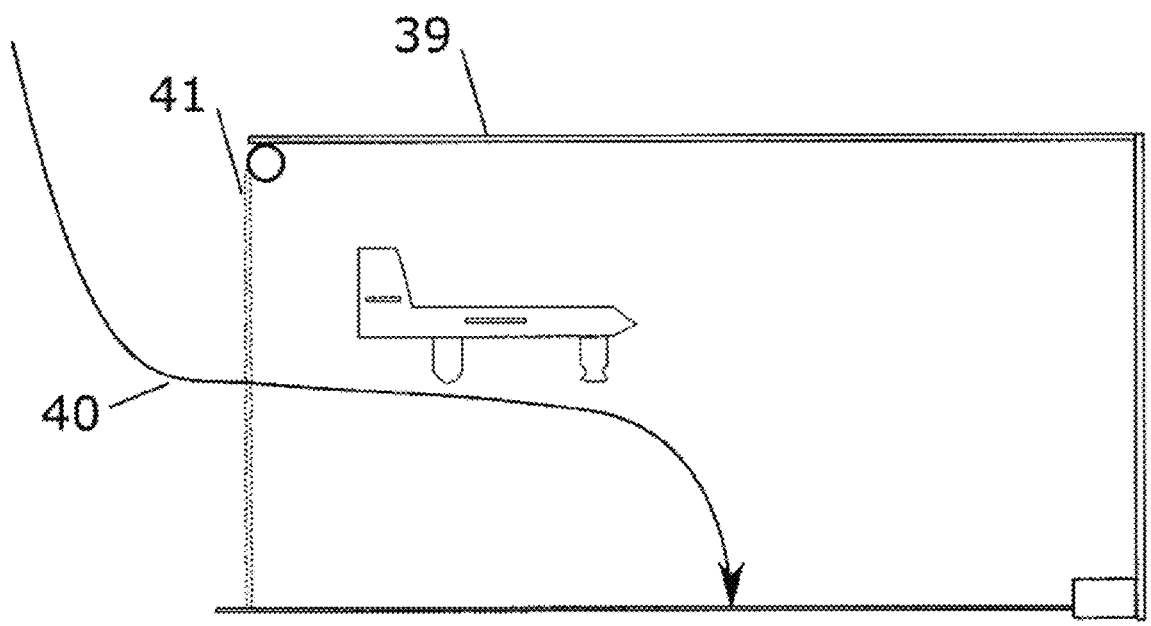

As shown in FIG. 12a, an improvement of the above described embodiments is achieved by providing a weather protection 38 (e.g. a roof). This allows the drone 1 to be protected on the landing/take-off site 2 during loading/unloading, refueling, etc. at the station 7 and for storage during interruptions in flight operations. In this embodiment, the surface of the landing/take-offing site 2 is preferably water-permeable. An improvement (see FIG. 12b) is achieved by an enclosure of the entire system 39, in which the drone flies in horizontally and then lands (the flight path is indicated by reference numeral 40). The entry opening of the enclosure can be protected by a shutter 41 preferably designed as a roller shutter. This embodiment is particularly suitable for use in areas where frequent environmental disturbances are expected, such as snow or dirt. Such a system can also be integrated into a building.

Figure 13:
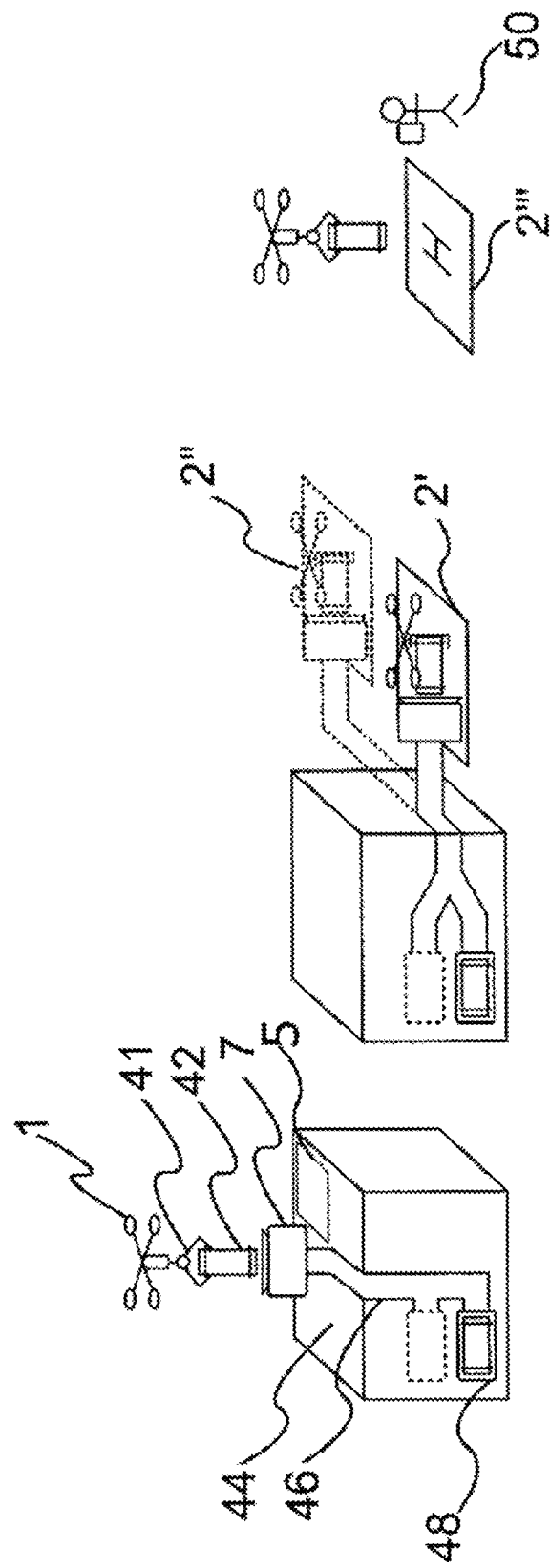
FIG. 13 is a schematic representation of a transport system using the positioning system according to the invention.

FIG. 13 shows a schematic representation of an exemplary transport system in which the positioning system of the present invention may be used. An essential component of the transport system is a drone 1 of any design, which is equipped with a holding mechanism 41 for a pneumatic tube capsule 42. This holding mechanism may be realized in various ways. In addition to the gripping mechanism shown, other embodiments are possible in which the shipment is inserted vertically from below or horizontally from behind or in front into the base body of the drone.

One or more loading/unloading stations 7 are provided on the ground in front of a building or on the roof of a building 44, which form the link between a drone 1 and a pneumatic tube system 46 (generally transport system). The loading/unloading station(s) 7 and the pneumatic tube system 46 are primarily provided in front of, in or on the building 6. On the roof of a building or in front of a building are one or more landing/take-off sites 2; 2', 2" for the drones. As shown and explained above, one or more associated loading/unloading stations 7 may be provided to load/unload a drone. Shipping and receiving of a shipment by a user occurs at pneumatic tube stations 48 (transfer stations), which may be single or multiple in a building.

Preferably, the loading/unloading stations 7 are designed for unloading and loading a drone. The two left figures of FIG. 13 show examples of vertical and horizontal loading/unloading of a drone, respectively. However, as shown in the right figure of FIG. 13, the drone may also approach a landing/take-off site 2''' to be manually loaded/unloaded by a user 50. Preferably, however, all landing/take-off sites are equipped with the system for automatic positioning of drone according to the invention.

The features described or indicated in the application documents, in particular in the figures, the claims and the description, may be essential for realizing the invention in various embodiments, both individually and in any combination.

The invention claimed is:

1. An automatic drone positioning system, the system comprising:
   a landing/take-off site comprising a landing area defined by an outer boundary;
   a rope sling; and
   a drone;
   wherein the system is configured to position and align the drone, landed at any location on the landing area, at a predetermined position on the landing area,
   wherein the rope sling, in its initial position, extends substantially along the outer boundary of the landing area, and the ends of which are connected to a rope winch located near or at the predetermined position so that the rope sling can be retracted when the rope winch is actuated, and
   wherein the drone is provided with engagement means configured to be engageable with the rope sling when the rope sling is retracted, so that the drone is pulled to the predetermined position and is correctly aligned at the predetermined position upon further retraction of the rope sling.

2. The system according to claim 1, wherein the system comprises reversing means configured to deploy the rope sling on the landing/take-off site to its initial position such that the rope sling extends substantially along the outer boundary of the landing area and substantially encloses the entire landing area.

3. The system according to claim 1, wherein the drone comprises at least three feet, wherein at least one of the feet is configured such that the rope sling slips under said at least one foot when the rope sling is retracted, and wherein at least one of the feet is configured as an engagement means such that said at least one foot engages with the rope sling when the rope sling is retracted, to pull the drone into the predetermined position upon further retraction of the rope sling.

4. The system according to claim 3, wherein the at least one rope-passing foot of the drone is provided in its lower portion with a tapering configured to be engageable with the rope sling, and wherein the at least one rope-catching foot is rounded at its lower end, such that the rope sling can slip under the foot when the rope sling is retracted.

5. The system according to claim 1, wherein the drone comprises at least three feet, wherein at least one of the feet is configured to be engageable with the rope sling in a first configuration, and to allow the rope sling to slip under its rounded bottom in a second configuration, wherein said at least one foot is provided with fold-out gripping means folded down in said first configuration and folded up in said second configuration, or wherein the at least one foot comprises a vertically displaceable sleeve provided with an outwardly projecting flange at the lower end.

6. The system according to claim 1, wherein the system comprises pusher means coupled to the rope winch to enable the drone to be pushed back towards the center of the landing area.

7. The system according to claim 1, wherein at least two further rope winches are provided which are spaced substantially along the outer boundary of the landing area, connected to the rope sling via associated ropes and configured to return the rope sling to its initial position such that the edges of the returned rope sling substantially extend along the outer boundary of the landing area, wherein the ropes of the rope winches are displaceably connected to the rope sling, optionally via rings.

8. The system according to claim 1, wherein, spaced substantially along the outer boundary of the landing area, at least two attachment points are provided to which are attached first ends of elastic elements, the second ends of which are each connected, preferably slidingly or by rings, to the rope sling in order to spread the rope sling to its initial position by action of the elastic elements, such that the edges of the spread-out rope sling substantially extend along the outer boundary of the landing area, wherein the elastic elements are selected from a group comprising rubber bands, springs and spring-tensioned winches.

9. The system according to claim 1, wherein the system includes at least one traction rope, wherein an additional winch is provided substantially at the outer boundary of the landing area for retracting the at least one traction rope, wherein two or more ends of the traction rope are attached to the rope sling via pulleys, which are provided spaced apart substantially along the outer boundary of the landing area, such that the rope sling can be spread out by operating the additional rope winch such that the edges of the spread-out rope sling substantially extend along the outer boundary of the landing area.

10. The system according to claim 1, wherein a ring track is provided around the landing area, on which at least three pulleys movable in a mechanical manner along the ring track are provided, which pulleys are coupled to the rope sling, wherein the rope sling can be spread out by moving the pulleys, such that the edges of the spread-out rope sling substantially extend along the outer boundary of the landing area.

11. The system according to claim 1, wherein the drone includes at least three feet, wherein there are provided two rope winches spaced apart from each other substantially along the outer boundary of the landing area and each provided with an associated rope sling, the rope slings each engaging a predetermined foot of the drone, when the rope slings are retracted, to move the drone to the predetermined position.

12. The system according to claim 1,
wherein the rope winch is configured to be connected to a loading/unloading station of a transport system to enable the drone to be loaded/unloaded with a shipment delivered via the transport system, and wherein the rope winch is configured to be optionally integrated with the loading/unloading station, and
wherein the rope winch is configured to be connected to a refueling facility for refueling the drone or to a charging station for charging a battery of the drone.

13. The system according to claim 1, wherein the rope winch is provided with rope winch guide means and the drone is provided with drone guide means at or in the drone, the rope winch guide means being configured to engage with the corresponding drone guide means to further precisely position and align the drone when the drone approaches the rope winch, and/or wherein the drone has at least three feet, wherein at least one of the feet is configured to engage with and to be guided by guiding elements provided on the landing area of the landing/take-off site, such that, when said at least one foot engages with the rope sling during retraction of the rope sling by the rope winch, the drone can be precisely positioned and aligned, when the rope sling is further retracted.

14. An automatic drone positioning system, the system comprising:
a landing/take-off site comprising a landing area defined by an outer boundary; and
a drone;
wherein the system is configured to position and align the drone, landed at any location on the landing area, at a predetermined position on the landing area,
wherein the system includes two separate, partially overlapping ring tracks surrounding the landing area such that the landing area is substantially enclosed by at least one of the ring tracks,
wherein the system includes a respective movable element at each of the two ring tracks which is movable along the respective ring track, a respective rope associated with each of the movable elements, and a respective winch associated with each of the ropes, wherein each of the two movable elements is connected to a first end of the associated rope, wherein a second end of each rope is connected to the associated rope winch,
wherein the system includes engagement means provided at the drone, wherein the ropes are displaced by moving the elements in combination with actuation of the rope winches so as to engage with the engagement means provided at the drone, such that the drone is moved to the predetermined position upon further displacement of the ropes.

15. The system according to claim 14, wherein the system includes a device for parking drones, wherein said device for parking drones is provided in the region of a rope winch, which parking device is configured to allow one or more drones to be removed from the landing area, parked, and moved back onto the landing area.

16. A system for transporting various goods from a point of origin to a remote destination by using a drone in combination with at least one stationary transport system and at least one system for automatically positioning a drone on a landing/take-off site, wherein the at least one transport system is connected with at least one loading/unloading station,
wherein the system is configured to position and align a drone, landed at any location on the landing area, at a predetermined position on the landing area,
wherein the system comprises a rope sling which, in its initial position, extends substantially along the outer boundary of the landing area, and the ends of which are connected to a rope winch located near or at the predetermined position so that the rope sling can be retracted when the rope winch is actuated, and
wherein the drone is provided with engagement means configured to be engageable with the rope sling when the rope sling is retracted, so that the drone is pulled to the predetermined position and is correctly aligned at the predetermined position upon further retraction of the rope sling.

17. The system according to claim 3, wherein the system includes guide elements which are provided on the landing area of the landing/take-off site, wherein at least one of the feet is configured to be engageable with the guide elements and to be guided by said guide elements.

18. The system according to claim 17, wherein at least one of the feet is provided with additional elements that can interact with the guide elements to enable further functions.

19. The system according to claim 4, wherein an additional component is provided at the drone that does not contact the surface of the landing/take-off site and is configured to be engageable with an element attached to the rope sling.

20. The system according to claim 2, wherein the drone comprises at least three feet, wherein at least one of the feet is configured such that the rope sling slips under said at least one foot when the rope sling is retracted, and wherein at least one of the feet is configured as an engagement means such that said at least one foot engages with the rope sling when the rope sling is retracted, to pull the drone into the predetermined position upon further retraction of the rope sling.

* * * * *